United States Patent [19]

Bell

[11] Patent Number: 4,704,631

[45] Date of Patent: Nov. 3, 1987

[54] DISPLAY DRIVER AMPLIFIER WITH ANTI-SATURATION CIRCUIT

[75] Inventor: Isaac M. Bell, Indianapolis, Ind.

[73] Assignee: RCA Corporation, Princeton, N.J.

[21] Appl. No.: 830,759

[22] Filed: Feb. 19, 1986

[51] Int. Cl.$^4$ .............................................. H04N 5/44
[52] U.S. Cl. ..................................... 358/188; 358/243; 358/184
[58] Field of Search ............... 358/170, 164, 243, 184, 358/32, 188, 74, 173, 65, 39; 307/265, 559, 561

[56] References Cited

U.S. PATENT DOCUMENTS

| | | | |
|---|---|---|---|
| 2,853,630 | 9/1958 | Lane et al. | 307/565 |
| 4,293,875 | 10/1981 | Katz | 358/184 |
| 4,298,885 | 11/1981 | Okada | 358/243 |
| 4,577,234 | 3/1986 | Harlan | 358/243 |

FOREIGN PATENT DOCUMENTS 1439917  6/1976  United Kingdom ................. 358/74

OTHER PUBLICATIONS

Reference Text "Pulse, Digital and Switching Waveforms" (McGraw-Hill, 1965), section 8-14, pp. 297-300.

Primary Examiner—James J. Groody
Assistant Examiner—David E. Harvey
Attorney, Agent, or Firm—Paul J. Rasmussen; Peter M. Emanuel; Ronald H. Kurdyla

[57] ABSTRACT

A video output amplifier has an output terminal coupled to a signal input electrode of a kinescope. A signal limiting circuit coupled to the output terminal limits the magnitude of large video output signals to prevent saturation of the video output amplifier. The limiting circuit includes a resistor and a limiting diode coupled from the output terminal to a bias potential.

5 Claims, 1 Drawing Figure

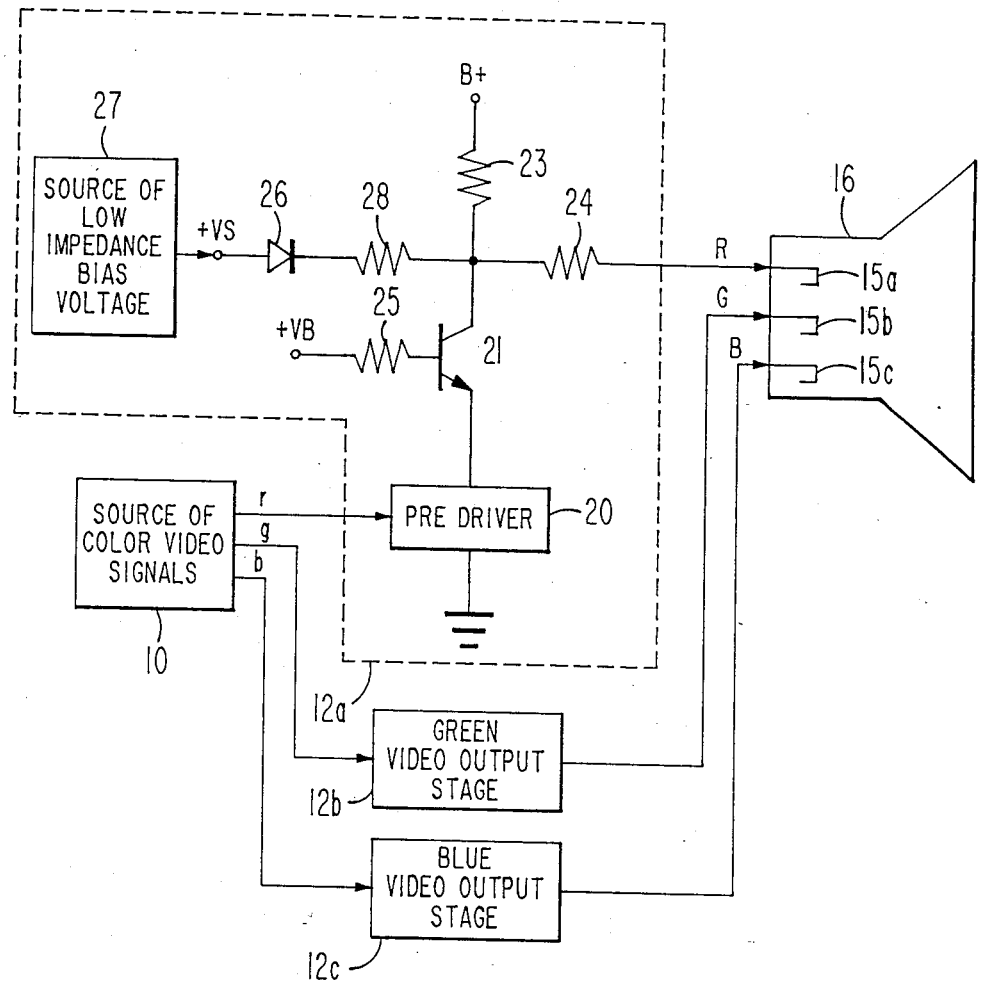

DISPLAY DRIVER AMPLIFIER WITH ANTI-SATURATION CIRCUIT

This invention concerns a video output amplifier for providing a video drive signal to an image display device such as a kinescope in a television receiver or a video monitor. In particular, this invention concerns an arrangement for preventing a video output amplifier from saturating in response to a large video signal.

Plural video output display driver stages are used to provide high level amplified video signals of up to 150 volts peak-to-peak amplitude, for example, to intensity control electrodes, e.g., cathode electrodes, of a kinescope in a color television receiver. High voltage output amplifier transistors of the driver stages are subject to conducting in a saturated state in response to large amplitude video signals representative of highly saturated color image information, peak white image information, and image peaking at the edges of white image areas.

A video output amplifier transistor exhibiting a saturated conductive state in response to a large amplitude video drive signal followed by a slow "recovery time" due to transistor charge storage effects can produce an objectionable white or colored image smear following a displayed image area produced by the large amplitude video drive signal. For example, if a white image area is displayed and the biasing of the red video output transistor is such that the red output transistor saturates, a red color smear following the white image area is likely to be produced as a result of the saturation of the red output transistor.

In accordance with the principles of the present invention, there is disclosed a non-saturating video output display driver stage with a signal output terminal coupled to an intensity control electrode of an image reproducing device such as a kinescope in a televison receiver. An amplitude limiting circuit including an impedance is coupled from the output terminal to a bias potential, and limits the magnitude of the video signal developed at the output terminal when the video signal exceeds a threshold level. In a preferred embodiment of the invention, the limiting circuit includes a resistor and a diode coupled in series in the order named from the output terminal of the driver stage to the bias potential.

The single FIGURE of the drawing shows a portion of a color television receiver including a video output display driver stage in accordance with the principles of the present invention.

A source of color video signals 10 provides low level color image representative video signals r, g and b. These signals are respectively amplified by red, green and blue video output display driver stages 12a, 12b and 12c, which supply high level amplified color video signals R, G and B to respective cathode intensity control electrodes 15a, 15b and 15c of a color kinescope 16. Since video output stages 12a, 12b and 12c are similar in structure and operation, only stage 12a will be described in detail.

Red output stage 12a includes an input pre-driver amplifier stage 20, and a video output amplifier transistor 21 having an emitter signal input and a collector load resistor 23 coupled to a source of operating potential (B+, approximately +230 volts in this example). High level video signal R is developed at the collector output of transistor 21 and is coupled via a current limiting resistor 24 to cathode 15a of kinescope 16.

Resistor 24 serves to protect transistor 21 from damage due to high currents associated with kinescope arcing. Pre-driver stage 20 may comprise a common emitter transistor amplifier stage arranged in a cascode amplifier configuration with common base amplifier transistor 21. Base bias for transistor 21 is provided by means of a bias resistor 25 and an associated source of bias voltage +VB.

In accordance with the principles of the present invention, a video signal amplitude limiting circuit including a resistor 28 and a normally nonconductive amplitude limiting diode 26 are connected in series from the collector output of transistor 21 to a source of low impedance bias voltage 27 which provides a bias voltage +VS.

A video signal appearing at the collector output of transistor 21 exhibits increasingly negative going amplitudes as video signal image information progresses from black through gray to white image information. Diode 26 is biased to be nonconductive for small through moderately large negative going video signal magnitudes at the collector of transistor 21. Very large negative going video signal magnitudes applied to the emitter input of transistor 21, e.g., representative of heavily saturated color image areas and peak white image areas, are capable of causing transistor 21 to conduct in a saturated state (without diode 26 and resistor 28). This condition is associated with a transistor 21 collector voltage somewhat less than +30 volts in this example. The recovery time from the saturated state is delayed by transistor charge storage effects and can produce an objectionable image smear following saturated color or peak white image areas.

Diode 26 is biased so that it conducts in response to a video signal magnitude of approximately +30 volts (with respect to ground) at the collector of transistor 21. The +30 volt level is slightly above (i.e., more positive than) the level at which transistor 21 is expected to saturate. The conduction of diode 26 prevents transistor 21 from saturating by limiting the magnitude of the collector voltage of transistor 21 associated with a large amplitude video signal. More specifically, diode 26 when conducting clamps the collector voltage of transistor 21 to a potential greater than the collector saturation voltage.

Resistor 28 advantageously decouples the parasitic capacitance of diode 26 from the collector output of transistor 21, thereby preventing the parasitic capacitance of diode 26 from impairing the high frequency response of the video output stage. In this regard it is noted that the parasitic capacitance of resistor 28, e.g., a ⅛ watt carbon device, is about ten times less than the parasitic capacitance of diode 26. Diode 26 may be a general purpose device with a current capability of approximately 25 milliamperes.

Resistor 28 also serves as a current limiter to protect diode 26 from damage due to excessive currents which may be induced by kinescope arcing. In addition, resistor 28 advantageously acts as a current limiting device or fuse to protect voltage source 27 and other receiver circuits which may be biased from source 27 from excessive currents in the event diode 26 short-circuits.

The value of resistor 28 is not critical, but should be relatively low in value, e.g., on the order of several kilohms, since an excessively large value of resistor 28 will compromise the limiting action of diode 26. Also in order to maintain effective limiting by diode 26, low impedance voltage source 27 preferably should exhibit an output impedance significantly less than, e.g., five times less than, the value of resistor 28.

In some television receivers or monitor designs the limiter circuit including diode 26 and resistor 28 may not be needed for all three red, green and blue video output stages, depending on the drive requirements for the respective output stages. The need for an anti-saturation limiting circuit is likely to be associated with the video output stage having the lowest cut-off voltage. Such output stage is often the video output stage having the largest drive requirement, i.e., driving the least efficient kinescope phosphor, which is often the red phosphor.

What is claimed is:

1. A video signal processing system comprising:
    an image display device for displaying video information in response to a video output signal provided to an intensity control electrode of said image display device;
    a display driver amplifier with a signal input for receiving a video input signal, and a signal output for providing said video output signal to said intensity control electrode of said display device;
    biasing means;
    normally nonconductive threshold conduction means coupled to said biasing means and to said signal output of said display driver amplifier, said threshold conduction means being rendered conductive in response to said video output signal exceeding a given amplitude, for limiting the magnitude of said video output signal to prevent saturation of said display driver amplifier; and
    current limiting resistor coupled in series with said threshold conduction device for coupling said threshold conduction device to said signal output of said display driver amplifier.

2. A system according to claim 1, wherein said threshold conduction means is a semiconductor PN junction device.

3. A system according to claim 2, wherein said display driver amplifier comprises a transistor with a base electrode, an emitter electrode, and a collector signal output electrode.

4. A system according to claim 2, wherein
    said biasing means is a source of bias potential exhibiting a source impedance less than an impedance value exhibited by said resistor.

5. In a television receiver, a video signal processing circuit comprising:
    an image display device for displaying video information in response to a video output signal provided to an intensity control electrode of said image display device;
    a display driver transistor with an emitter electrode for receiving a video input signal to be amplified, a base electrode, and a collector output electrode for providing said video output signal to said intensity control electrode of said display device;
    a source of bias voltage;
    a normally nonconductive limiter diode coupled to said source of bias voltage; and
    a resistor for coupling said diode to said collector output electrode; wherein
    said diode is rendered conductive in response to said video output signal exceeding a given amplitude for limiting the magnitude of said video output signal to prevent saturation of said driver transistor.

* * * * *